United States Patent
Baba

(10) Patent No.: US 6,644,824 B2
(45) Date of Patent: Nov. 11, 2003

(54) LIGHT UNIT USING POINT LIGHT SOURCE, AND LIQUID CRYSTAL DISPLAY USING THE SAME LIGHT UNIT

(75) Inventor: Masatake Baba, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/027,014

(22) Filed: Dec. 21, 2001

(65) Prior Publication Data

US 2002/0080433 A1 Jun. 27, 2002

(30) Foreign Application Priority Data

Dec. 22, 2000 (JP) ......................................... 2000/391669

(51) Int. Cl.[7] ................................................. F21V 8/00
(52) U.S. Cl. ........................... 362/31; 362/337; 362/330
(58) Field of Search ........................... 362/31, 337, 330, 362/561

(56) References Cited

U.S. PATENT DOCUMENTS

| | | | | |
|---|---|---|---|---|
| 6,293,683 B1 | * | 9/2001 | Okada ........................... | 362/26 |
| 6,330,386 B1 | * | 12/2001 | Wagner et al. ................. | 349/63 |
| 6,343,867 B1 | * | 2/2002 | Suzuki et al. .................. | 362/31 |

FOREIGN PATENT DOCUMENTS

| | | |
|---|---|---|
| EP | 0866264 A1 | 3/1998 |
| EP | 0969311 A1 | 6/1999 |
| JP | 10-260405 | 9/1998 |
| JP | 2000-11723 | 1/2000 |
| JP | 2000-155315 | 6/2000 |
| WO | WO 00/32981 A1 | 6/2000 |

* cited by examiner

Primary Examiner—Sandra O'Shea
Assistant Examiner—Hargobind S Sawhney
(74) Attorney, Agent, or Firm—Choate, Hall & Stewart

(57) ABSTRACT

In a light unit that converts a false linear light into which a light from a point light source has been converted by a columnar light guide, into a planar light by a plate-shaped light guide, the point light source is arranged only at an end of the columnar light guide at which an angle between a longitudinal direction of the columnar light guide and ridge lines of recesses and projections forming a prism surface is obtuse. Thus, a positional relationship between the point light source and the ridge lines is set so that a main irradiation direction of band-shaped light emitted from the columnar light guide and which has been obtained by converting the light from the point light source to a false linear light is not substantially orthogonal to the ridge lines of the recesses and projections forming the prism surface of the plate-shaped light guide. Consequently, light obtained by totally reflecting this band-shaped light is unlikely to be viewed. Therefore, there is provided a liquid-crystal display having a light unit that eliminates a non-uniformity of luminance even if the angle between the direction in which pixels are arranged on a liquid-crystal panel in a matrix and the ridge lines of the recesses and projections constituting the prism formed on the surface of the plate-shaped light guide is set to have a predetermined value in order to prevent moiré stripes.

8 Claims, 14 Drawing Sheets

LIGHT UNIT USING POINT LIGHT SOURCE, AND LIQUID CRYSTAL DISPLAY USING THE SAME LIGHT UNIT

BACKGROUND OF THE INVENTION

1. Field of the Invention

The present invention relates to a light unit using a point light source, and a liquid crystal display using the light unit as a front light.

2. Description of the Related Art

Reflection type liquid-crystal displays are notably mounted in portable electronics such as cellular telephones, personal digital assistants (PDA), and notebook personal computers because they allow a user to clearly view images in a light place than transmitted type liquid-crystal displays. The reflection type liquid-crystal display has a surface light source device as a light unit to provide against insufficient ambient light if it is used outdoors at night.

When an attempt is made not to see moiré stripes by setting a desired positional relationship between the arrangement of recesses and projections forming a prism surface of a light guide panel for use in a light unit and the direction in which pixel electrodes reflecting light are arranged, a problem occurs if a point light source is used to provide light incident on the light guide panel. The causes of this problem will be sequentially described below.

As shown in FIG. 18, a light unit 102 in a reflection type liquid-crystal display 101 is arranged on the front surface side of the display which is opposite an observer relative to a reflection type liquid-crystal panel 22 based on, for example, a TFT (Thin Film Transistor) method, in order to irradiate the liquid-crystal panel 22 with illumination light, while transmitting reflected light from the liquid-crystal panel 22, through the liquid-crystal panel so that the observer can view the light. This is called a "front light". Line light sources using fluorescent lamps or the like have been used for the front light.

As shown in FIGS. 18 and 20, the front light 102 has a fluorescent lamp 104 shaped like a thin tube, a reflector 105 that covers three peripheral sides of the fluorescent lamp 104 in the longitudinal direction thereof to reflect light from the fluorescent lamp 104 to emit band-shaped light through an open side of the reflector, and a light guide panel 7 comprising a light transmitting material and shaped like, for example, a plate and which receives direct light from the fluorescent lamp 104 or reflected light from the reflector 105 on a facet 4 and converts the received incident light into planar light to reflect this light to the liquid-crystal panel 22, while transmitting and guiding the reflected light from the liquid-crystal panel 22 to the observer.

The light guide panel 7 has a prism surface 6 on one side thereof which has a stripe-like pattern of recesses and projections forming a plurality of linear parallel ridge lines, and a flat light applied surface 5 on the back surface thereof. Further, as shown in FIG. 19, which is an enlarged view of a portion E of FIG. 18, which is a side view of the liquid-crystal display 101, the prism surface 6 has, for example, steep slopes 12 and gentle slopes 13 which are alternatively formed. The light guide panel 7 receives band-shaped light from the fluorescent lamp 104 through a facet 4 side, converts the incident light into planar light at the prism surface 6, and then reflect it to the liquid-crystal panel 22. The light impinging on the liquid-crystal panel 22 is reflected by the liquid-crystal panel 22, transmitted through the light guide panel 7 again, and then emitted.

On the other hand, the liquid-crystal panel 22 has pixels driven by, for example, the TFT method. As shown in FIGS. 21 and 22, the liquid-crystal panel 22 has a TFT substrate 24 having a large number of TFTs 111 and pixel electrodes 112 formed in a matrix, an opposite substrate 25 fixed opposite the TFT substrate 24 via a clearance of several-pm size and having a colored layer (color filter) 115 formed thereon, a liquid crystal layer 26 sealed in the clearance, and a polarizing plate 27 and a quarter wavelength plate 28 both disposed outside the opposite substrate 25. The pixel electrode 112 is also used as a reflection member.

Moiré stripes, interference stripes resulting from overlapping of groups of parallel lines arranged at a predetermined pitch, may be viewed depending on how the ridge lines on the prism surface 6 overlap the pixel arrangement of the liquid-crystal panel 22, thereby degrading display quality. The reason why these moiré stripes are viewed will be described below. The stripe-shaped recesses and projections of the prism serve to concentrate light in one direction, thereby creating small differences in brightness along the ridge lines of the recesses and projections. On the other hand, if the pixel electrodes of the liquid-crystal display are used to reflect light, some of the clearances between adjacent pixels fail to reflect light. Since the liquid panel has the pixels arranged in a matrix and composed of the TFTs 111 and the pixel electrodes 112, as shown in FIG. 21, those areas which do not reflect light appear like stripes. If the ridge lines of the prism cross the arrangement direction of the pixels at a small angle, the above described brighter and darker areas are likely to interfere with each other when crossing each other, thereby causing moiré stripes as interference stripes to be viewed. These moiré stripes are most noticeable when the ridge lines 110 of the prism surface 6 are slightly offset from the pixel arrangement direction in the horizontal or vertical direction of the display.

Moiré stripes are not seen by paralleling the ridge lines of the prism and the pixel arrangement direction or setting these directions to cross each other at a large angle. However, the prism is provided in the light guide panel, the pixels are provided in the liquid-crystal panel, and the light guide panel and the liquid-crystal panel are separate components constituting the liquid-crystal display. Accordingly, the ridge lines of the prism and the pixel arrangement direction are likely to cross each other at a small angle in spite of an attempt to parallelize these directions. Thus, instead of parallelization, the ridge lines and the pixel arrangement direction may be set to cross each other at a large value.

Thus, it has been contemplated that the ridge lines may be formed at about 23° from the direction in which the pixels are arranged in a matrix. Such a technique is described in, for example, "Technological Trend of Front Lights" by Akira TANAKA (Monthly Display, June 1999, p. 48 to 53) and Japanese Patent Laid-Open No. 2000-155315. The direction in which the pixels are arranged in a matrix is generally parallel with the longitudinal direction of the fluorescent lamp. Accordingly, as shown in FIG. 20, the ridge lines 110 are formed at an angle θ of about 23° from the longitudinal direction of the fluorescent lamp 104 and at a predetermined pitch p0.

However, if the fluorescent lamp is used as a light source, it has high power consumption and requires an inverter that generates a high voltage for lighting. Accordingly, the fluorescent lamp is an obstacle to the reduction of the size and weight of the display. To meet the demand for the reduction of the power consumption, size, and weight the display, a technique has been proposed which converts light from a point light source composed of, for example, white LEDS (light emitting diodes) into false linear light using a light guide, as described in Japanese Patent Laid-Open No. 2000-11723 or the like. Japanese Patent Laid-Open No. 10-260405, which relates to a back light, also describes the technique of converting light from LEDs as a point light source into false linear light.

A front light using such a point light source will be described with reference to, for example, Japanese Patent Laid-Open No. 2000-1723, mentioned above. As shown in FIGS. 23 and 24, a front light 201 has a point light source 2a composed of, for example, white LEDs, a light guide 3 that converts light emitted from the point light source into band-shaped light, and a light guide panel 204 comprising a light transmitting material and shaped like, for example, a plate and which receives the band-shaped light from the light guide 3 and converts the incident light into planar light to reflect this light to a liquid-crystal panel, while transmitting and guiding reflected light from the liquid-crystal panel to the observer. When the front light 201 and the liquid crystal panel are assembled into a reflection type liquid-crystal panel, for example, the longitudinal direction of the light guide 3 of the front light 201 substantially matches the pixel arrangement direction of the liquid-crystal display, and the front light 201 is disposed on the display surface side of the liquid crystal panel.

The light guide panel 204 has a large number of grooves 206 formed in a surface 205 of the light guide panel 204 along the longitudinal direction of the light guide 3, that is, the pixel arrangement direction of the liquid-crystal panel and which grooves are parallel with a stripe-like pattern. The light guide panel 204 receives band-shaped light from the light guide 3 via a facet 207 thereof, and reflects the received incident light from the surface 205 to a back surface 208 to irradiate the liquid-crystal panel with the illumination light, while transmitting reflected light from the liquid-crystal panel, through the light guide panel. Further, to increase the quantity of light, a front light 201A may be used which has point light sources 2a and 2b at the opposite ends of the light guide 3, as shown in FIG. 25. Thus, the front light 201 having the point light source 2a arranged at only one end of the light guide 3 and the front light 201A having the point light sources 2a and 2b arranged at the opposite ends of the light guide 3 have a reduced power consumption, size, and weight. Consequently, these front lights are expected to be effectively mounted in, for example, cellular telephones.

However, in the front lights 201 and 201A described in Japanese Patent Laid-Open No. 2000-11723 and using the point light source, the grooves 206 formed in the surface of the light guide panel 204 are formed generally parallel with the longitudinal direction of the light guide 3 (that is, the pixel arrangement direction). Accordingly, these front lights cannot prevent moiré stripes as described above, thereby possibly degrading the display quality.

Thus, an inventor contemplated that the light guide 7 having the ridge lines 110 of the prism inclined at an angle θ from the linear light source 104 shown in FIG. 20 may replace the light guide panel 204 in the front light 201 (FIG. 23) or 201A (FIG. 25). The inventor experimentally produced a front light 301 using point light sources 2a and 2b and in which the ridge lines 110 of the prism surface 6 of the light guide panel 7 are inclined at the predetermined angle θ from the longitudinal direction of the light guide 3, as shown in FIGS. 26 to 28.

In the front light 301, the ridge lines 110 of the prism surface 6 are formed at the angle θ, for example, about 23° from the longitudinal direction of the light guide 3 as shown in FIG. 26, and at a predetermined pitch p0. Further, the light guide 3 is provided with a reflecting plate that surrounds three sides of the light guide 3. In the other points, the front light 301 is the same as the conventional technique shown in FIG. 25. Further, the prism surface 6 has, for example, the steep slopes 12 and the gentle slopes 13 which are alternately formed, as shown in FIG. 29.

As shown in FIG. 26, an incident light from the point light source 2a, arranged on the side of the light guide 3 on which the longitudinal direction of the light guide 3 and the ridge lines make an obtuse angle, is converted into band-shaped light by the reflecting plate (not shown), surrounding all the sides of the light guide other than its light entering and emitting surface. The band-shaped light is then emitted to the facet 4 of the light guide panel 7. However, this band-shaped light is polarized toward an end of the light guide which is opposite the other end thereof with the light source 2a rather than traveling through the light guide panel in a direction perpendicular to the longitudinal direction of the light guide 3, as shown in FIG. 28. This polarization occurs because when light incident on the light guide from the point light source is reflected from the reflecting plate, it is mainly reflected away from the point light source (a main irradiation direction in which light is most intense) and then impinges on the light guide panel. Thus, it is likely that a triangular area (312 in FIG. 26) is formed in which light is unlikely to reach locations close to those of the side surface of the light guide panel perpendicular to the longitudinal direction of the light guide which are closer to the point light source 2a.

On the other hand, the ridge lines 110 are inclined through about 23° from the light guide 3 as described above, so that the main irradiation direction V is likely to be orthogonal to the ridge lines 110. Thus, as shown in FIG. 29, when light incident in the main irradiation direction V, which is generally orthogonal to the ridge lines, impinges on the steep slope 12, which forms a recess and a projection of the prism, it is totally reflected in a generally perpendicularly downward direction W. This reflected light is transmitted through the light applied surface 5 and then totally reflected from the liquid-crystal panel 22 and generally perpendicularly to the liquid-crystal panel 22, as shown in FIG. 27. Then, the light is transmitted through the light guide panel 7 again, emitted in a generally perpendicular direction from the front surface of the front light 30, and then viewed by the observer. That is, intense light traveling in the main irradiation direction is emitted in the observer's viewing direction and viewed by the observer as it is. Accordingly, the light travelling in the main irradiation direction is viewed as more intense light than light travelling in the other directions. Consequently, only the light travelling in the main irradiation direction, which is generally orthogonal to the ridge lines, becomes intense and is viewed by the observer after reflection. Owing to a combination of the facts that certain areas appear as intense light and that a triangular area is formed in which light is unlikely to reach certain locations, stripe-shaped lines forming brighter and darker areas are viewed on the surface of the light guide panel, thereby degrading the display quality.

Furthermore, the main irradiation direction V0 of light incident from a corner 310 of the light guide panel 7 which is closer to the point light source 2a is slightly polarized from the perpendicular direction y of the display toward the end of the light guide 3 which is opposite the other end with the point light source 2a. Further, virtually no light is incident from a facet 311 of the light guide plate 6 which is perpendicular to the facet 4 thereof and which is located closer to the point light source 2a. Consequently, as shown in FIG. 26, a generally triangular relatively dark area 312 is formed, thereby disadvantageously making bright lines conspicuous.

If a fluorescent lamp is used as a light source such as the one shown in FIG. 20, the phenomenon in which brighter and darker areas composed of stripe-shaped lines appear is also observed, but to an acceptable degree. In contrast, the phenomenon in the case of the front light 301 using the point light source shown in FIG. 26 affects the display quality. In this case, the phenomenon is observed whether or not another point light source 2b is present. That is, even when the inventor tested a front light 301A using a single point light source as shown in FIG. 30 in order to further reduce the power consumption, size, and costs of the display, brighter and darker areas composed of stripe-shaped lines appeared, as in the case with the front light 301 having the point light sources arranged on the opposite sides of the light guide.

As shown in FIG. 31, a diffusion member 31 of a predetermined thickness may be interposed between the light guide 3 and the light panel 7 to level off the peak of the intensity of light travelling in the main irradiation direction, in which the light is most intense. However, the peak in the main irradiation direction V can be restrained only to the extent that light of a required intensity travels throughout the light guide panel 7, resulting in insufficient diffusion. Consequently, stripe-shaped lines are still viewed. Thus, it has hitherto been impossible to reliably restrain the degradation of display quality associated with non-uniform luminance.

The present invention is provided in view of these points, and it is an object thereof to provide a front light, a liquid-crystal display, and electronics which can reliably reduce the occurrence of non-uniform luminance to improve display quality.

SUMMARY OF THE INVENTION

It is thus an object of the present invention to provide a further improved light unit.

It is another object of the present invention to provide a light unit having an improved structure comprising a point light source and a plate-shaped light guide having a prism disposed thereon and formed of recesses and projections having ridge lines.

It is further another object of the present invention to provide a light unit having a structure that can eliminate the non-uniformity of luminance even if a point light source is used, when false linear light into which light from the point light source is converted by a columnar light guide.

It is further another object of the present invention to provide a light unit having a structure that can eliminate the non-uniformity of luminance when false linear light into which light from the point light source is converted by the columnar light guide even if the angle between the direction in which pixels are arranged on the liquid-crystal display in a matrix and the ridge lines of the recesses and projections forming the prism formed on the surface of the plate-shaped light guide is set to have a predetermined value.

A light unit according to the present invention comprises a columnar light guide that reflects light emitted from a point light source, to emit generally band-shaped light, and a rectangular plate-shaped light guide that receives the light emitted from the columnar light guide, through a facet thereof, and reflects and refracts the light received through the facet, using a prism surface thereof having recesses and projections formed thereon and forming a plurality of linear parallel ridge lines, so that planar light is emitted from a light applied surface thereof which is opposite the prism surface, wherein the point light source is arranged only at an end of the face of the columnar light guide at which the angle between the facet and the ridge lines is obtuse.

Furthermore, a light unit according to the present invention has a columnar light guide that receives light emitted from a point light source, through an end thereof, and reflects and refracts the received light while guiding it in a longitudinal direction thereof, to emit generally band-shaped light through a side surface thereof, and a plate-shaped light guide that receives light emitted from the columnar light guide through a facet thereof, and reflexes and refracts the light received through the facet using a prism surface having recesses and projections formed thereon and forming a plurality of linear parallel ridge lines inclined through a predetermined angle from the longitudinal direction of the columnar light guide, so that planar light is emitted from a light applied surface of the plate-shaped light guide which is opposite the prism surface, wherein the point light source is arranged only at an end of the facet of the plate-shaped light guide at which the angle between the facet and the ridge lines is obtuse.

According to this configuration, the positional relationship between the point light source and the ridge lines is set so that the main irradiation direction of band-shaped light emitted from the columnar light guide changing false linear light from the point light source is not generally orthogonal to the ridge lines of the recesses and projections forming the prism surface of the plate-shaped light guide. Consequently, light obtained by totally reflecting this band-shaped light is unlikely to be viewed, there by eliminating the non-uniformity of luminance.

BRIEF DESCRIPTION OF THE DRAWINGS

The above and other objects, advantages, and features of the present invention will be more apparent from the following description taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the invention is not limited to the embodiments illustrated for explanatory purposes.

Figure 1:
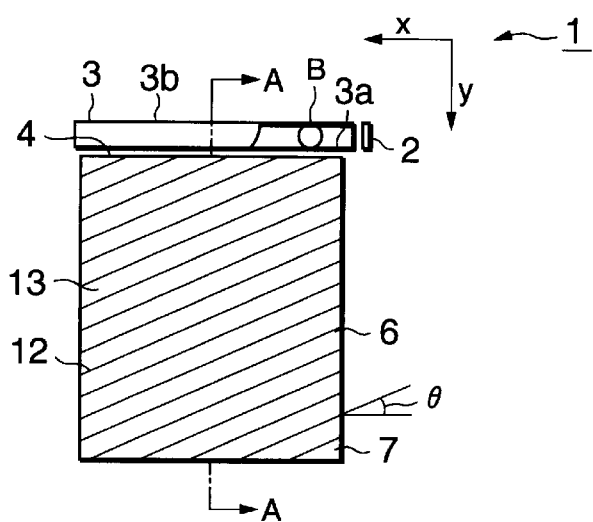
FIG. 1 is a partially broken plan view showing a configuration of a front light as an embodiment of the present invention.
Figure 2:
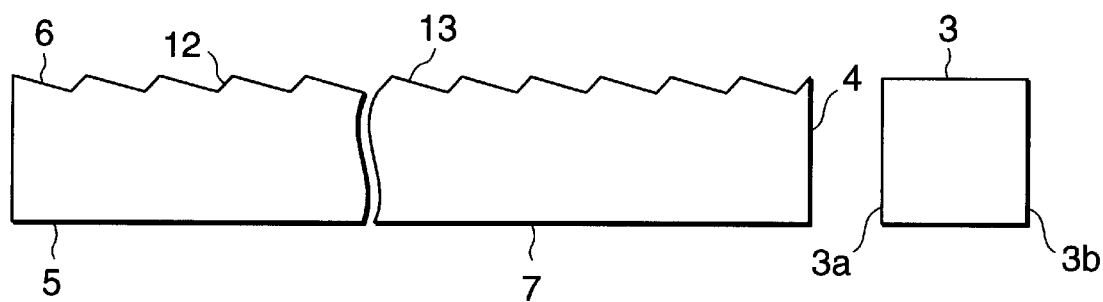
FIG. 2 is a sectional view taken along a line A—A in FIG. 1.

Next, referring to FIG. 1, a front light and a liquid-crystal display as an embodiment of the present invention will be described below. FIG. 1 is a plan view of a construction of a front light as an embodiment of the present invention. FIG. 2 is a sectional view taken along a line A—A in FIG. 1. The front light 1 in this example has a point light source 2 composed of white LEDs, a prismatic light guide (columnar light guide) 3 that emits light emitted from the point light source 2, as band-shaped light, and a rectangular flat light guide panel (plate-shaped light guide) 7 that irradiates light from the light guide 3 into a facet 4 thereof, and reflects and refracts the light received through the facet 4, using a prism surface thereof having recesses and projections formed thereon and having a plurality of linear parallel ridge lines, so that planar light is emitted from a light applied surface 5 of the light guide plate which is opposite the prism surface. The planar light emitted from the light applied surface 5 is applied to a reflection type liquid-crystal panel that is opposite the light applied surface 5. The light applied to the liquid-crystal panel is reflected within the liquid-crystal panel, impinges on the flat light guide 7 again, and is then emitted from the prism surface 6 of the flat light guide 7 composed of a light transmitting material. The point light source is arranged only at an end of the facet 4 of the light guide 7 at which the angle between the facet 4 and the ridge lines is obtuse. Further, as shown in FIG. 1, the ridge lines of the prism surface 6 are formed to incline through a predetermined angle θ from the longitudinal direction of the light guide 3.

Figure 3:
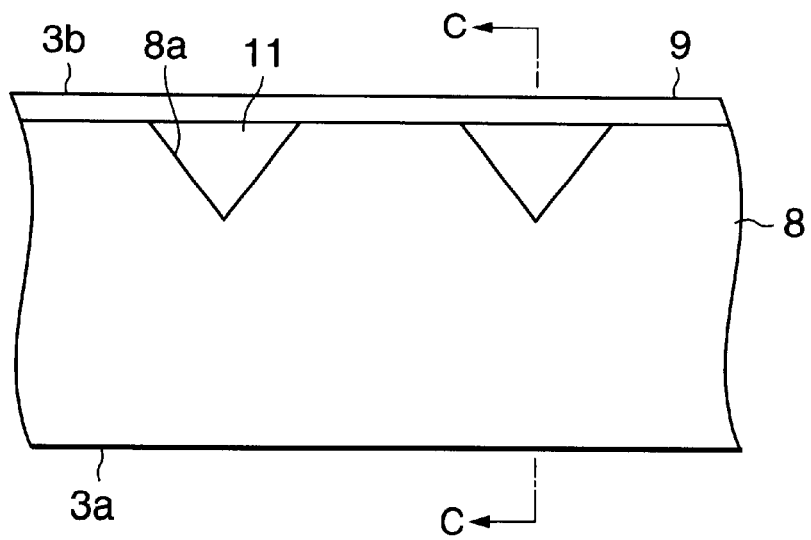
FIG. 3 is an enlarged plan view of a portion B of FIG. 1.
Figure 4:
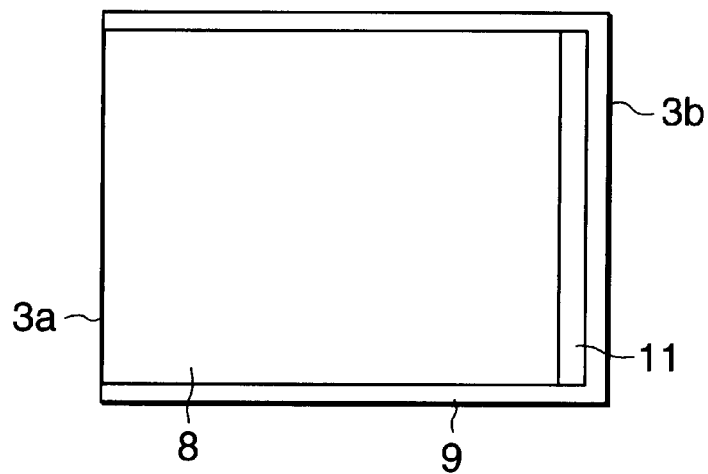
FIG. 4 is a sectional view taken along a line C—C in FIG. 3.

The columnar light guide 3 is formed of a prismatic transparent member 8 composed of a light transmitting material such as an acrylic resin and a reflecting plate 9 covering all the longitudinal surfaces of the transparent member other than a facet 3a through which light is emitted. A facet 3b of the prismatic transparent member 8 which is opposite the facet 3a through which light is emitted from the columnar light guide 3 has prismatic wedge-shaped recesses 8a regularly formed as shown in FIG. 3. The reflecting plate 9 is composed of metal such as aluminum or a resin the surface of which is coated with a white film that reflects light. The reflecting plate 9 has a groove-shaped cross section as shown in FIG. 4. Clearances 11 that are generally shaped like triangular poles and have air trapped therein are formed at those locations between the prismatic transparent member 8 and the reflecting plate 9 where the recesses 8a are formed. If the surface of the prismatic transparent member 8 sufficiently reflects light, the reflecting plate 9 is not required. On the other hand, if the reflecting plate 9 can emit light emitted from the point light source, as band-shaped light, the prismatic transparent member 8 is not required.

As shown in FIG. 2, the light guide panel 7 is composed of a light-transmitting rectangular thin-plate-shaped member made of an acrylic-based resin, and has an entrance facet 4 located opposite the light guide 5, a light applied surface 5 arranged substantially perpendicularly to the entrance facet 4 and closer to the liquid-crystal panel, and a prism surface 6 located opposite the light applied surface 5.

As shown in FIGS. 1 and 2, the prism surface 6 has an uneven shape comprised of, for example, reflecting surfaces (reflecting sections) 12 that are relatively steep relative to the light applied surface 5 and transmitting surfaces (transmitting sections) 13 that are relatively gentle relative to the light applied surface 5, the reflecting and transmitting surfaces being periodically and alternately formed at a predetermined pitch. The relatively steep reflecting surfaces (reflecting sections) 12 mainly reflect light incident from the facet 4 to irradiate the liquid-crystal panel with this light. The relatively gentle transmitting surfaces (transmitting sections) 13 mainly transmit ambient light to the liquid-crystal panel 22, while transmitting reflected light from the liquid-crystal panel so that the observer can view this light.

Figure 5:
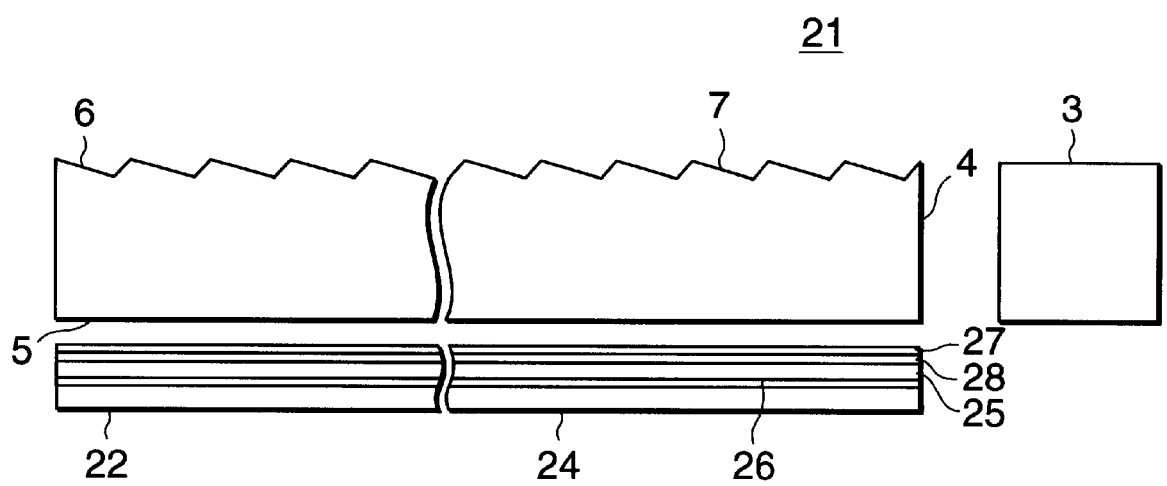
FIG. 5 is a sectional view showing a configuration of a liquid-crystal display comprising a light unit shown in FIG. 1.

And, as shown in FIG. 5, the front light 1 is positioned between a reflection-type liquid-crystal panel 22 in which a lot of pixels are arranged within a display area in a matrix state, and the observer to constitute a liquid crystal display 21. The front light 1 radiates an illumination light, and simultaneously transmits a reflected light from the liquid-crystal panel 22 to the observer-side, and the reflected light is visually recognized by the observer.

In this case, the longitudinal direction x of the light conduct 3 substantially matches one of the two orthogonal arrangement directions of the pixels of the liquid-crystal panel 22. Accordingly, as described in the "Description of the Related Art", the direction of the stripe-shaped ridge lines of the prism 6 is inclined through the angle θ from the pixel arrangement direction, that is, the longitudinal direction of the light guide 3.

The liquid-crystal panel 22 is rectangular and is based on, for example, the TFT method. The liquid-crystal panel 22 has a TFT substrate 24 having a large number of TFTs and transparent pixel electrodes formed thereon, an opposite substrate 25 fixed opposite the TFT substrate 24 via a clearance of several μm size and having a colored layer (color filter) formed thereon, a liquid-crystal layer 26 sealed in the clearance, and a polarizing plate 27 and a quarter wavelength plate 28 both disposed outside the opposite substrate 25, as shown in FIG. 5.

Figure 6:
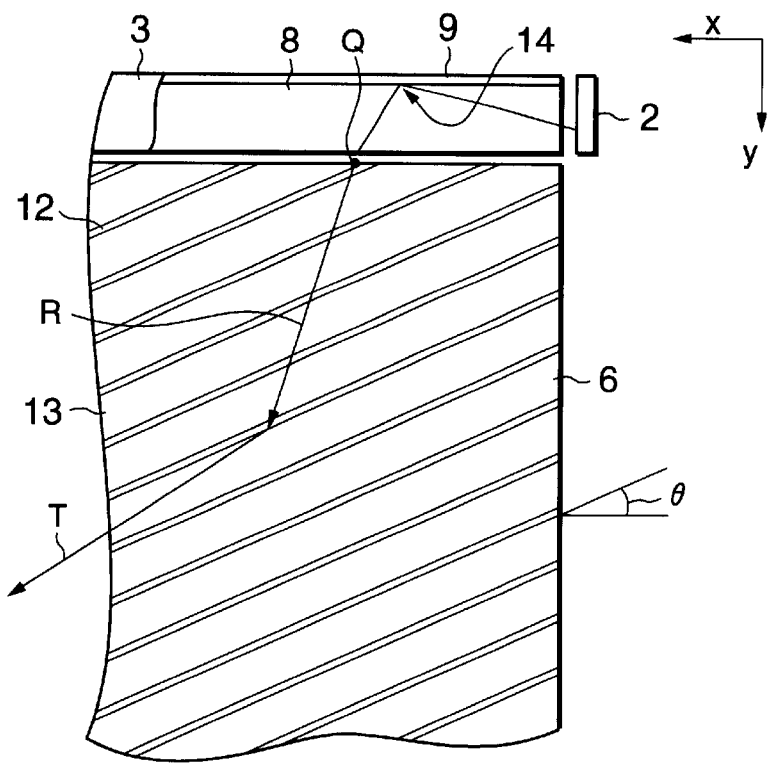
FIG. 6 is an explanatory representation illustrating functions of the light unit shown in FIG. 5.
Figure 7:
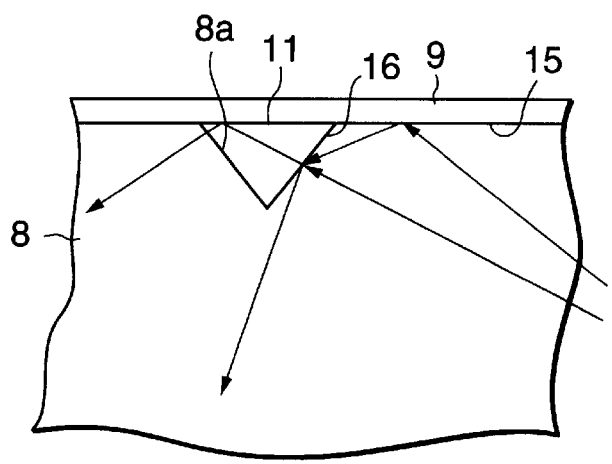
FIG. 7 is an explanatory representation illustrating functions of a columnar light guide shown in FIG. 6.

Now, the functions of the display will be described below. First, light emitted from the point light source 2 propagates through the prismatic transparent member 8 to reach a boundary between the prismatic transparent member 8 and the reflecting plate 9 as shown in FIG. 6. Then, as shown in FIG. 7, part of the light is reflected from a boundary surface 15 between the columnar transparent member 8 and the reflecting member 9, part of the light is reflected from a boundary surface 16 between the columnar transparent member 8 and the clearance 11, and part of the light is refracted by the boundary surface 16 between the columnar transparent member 8 and the clearance 11. The light generally advances along the longitudinal (horizontal) direction x and substantially uniformly impinges on the entrance facet 4. The incident light is substantially uniform, but as shown in FIG. 6, light incident on an arbitrary entrance point Q on the facet 4 is polarized toward the horizontal direction x from the perpendicular direction y of the display. Further, a main irradiation direction R in which the light is most intense is inclined through a predetermined acute rotational angle from the perpendicular direction y.

Figure 8:
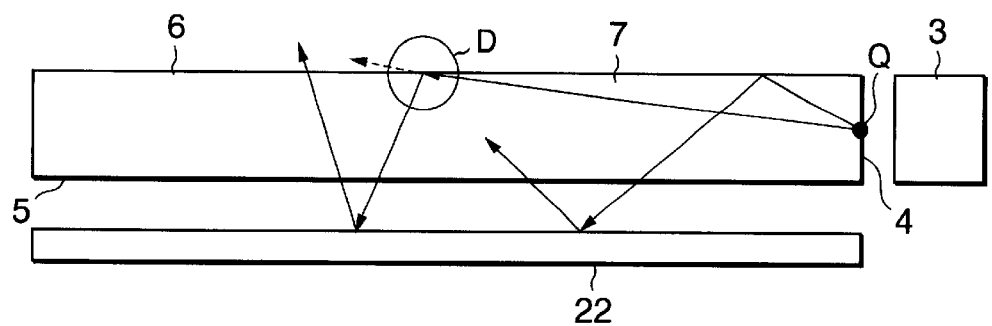
FIG. 8 is an explanatory representation illustrating functions of the light unit shown in FIG. 5.
Figure 9:
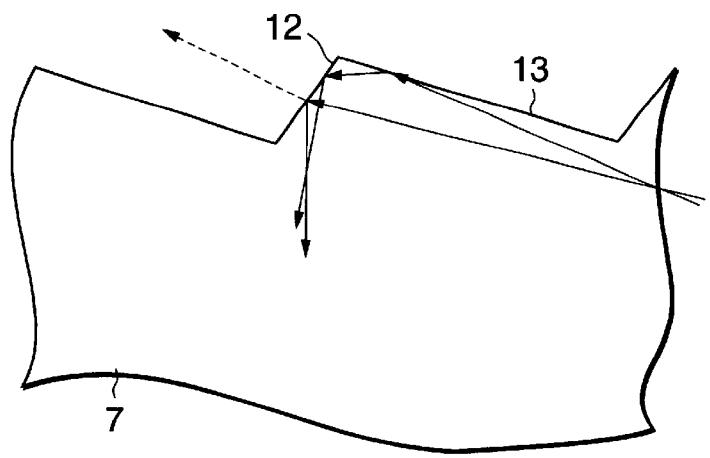
FIG. 9 is an enlarged plan view of a portion D of FIG. 8.
Figure 10:
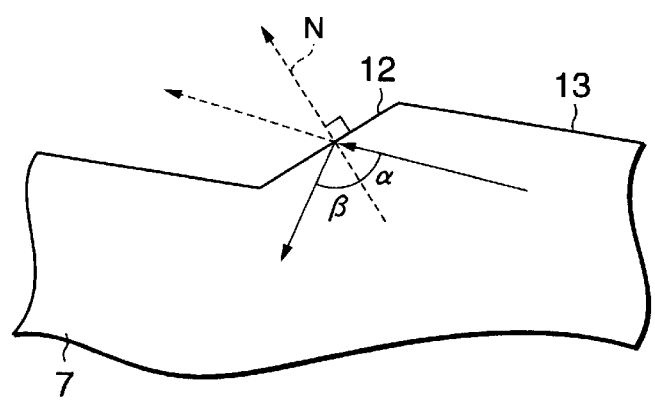
FIG. 10 is an explanatory representation illustrating functions of a reflecting surface in FIG. 9.

As shown in FIGS. 8 and 9, part of the light incident from the facet 4 directly reaches the reflecting surface 12, while part of this light reaches the reflecting surface 12 after being reflected by or transmitted through the transmitting surface 13. Then, most of the light is reflected to the light applied surface 5, from which illumination light is applied to the liquid-crystal panel 22. Further, a small part of the light is transmitted through the reflecting surface 12 in a transmitting direction as leakage light. As shown in FIG. 6, light reaching the reflecting surface 12 after travelling in the main irradiation direction R obliquely impinges on the reflecting surface 12, which forms the ridge line. As shown in FIGS. 9 and 10, light impinging on the reflecting surface 12 after travelling in the main irradiation direction R has a larger incident angle (the angle between the normal direction N of the reflecting surface 12 and the incident direction) a than, for example, light impinging on the reflecting surface 12 after travelling in a direction orthogonal to the direction of the stripes constituting the ridge lines. Further, the reflection angle (the angle between the normal direction N of the reflecting surface 12 and the emitting direction) β of light reflected by the reflecting surface 12 increases consistently with the incident angle α. Consequently, light impinging on the reflecting surface 12 after travelling in the main irradiation direction R is reflected to a location relatively away from one immediately below the reflecting surface 12. Thus, if the liquid-crystal display 21 is observed from immediately above, intense light travelling in the main irradiation direction is unlikely to be viewed after reflection compared to the prior art. In particular, bright lines resulting from intense light close to the point light source 4 are unlikely to be viewed. Further, a triangular dark area as observed in the prior art is not so conspicuous.

Light emitted from the light irradiation surface 5 is applied to the liquid-crystal panel 22. As shown in FIG. 5, the light incident on the liquid-crystal panel 22, linear polarization passing through the polarizing plate 27 is converted into circular polarization by the quarter wavelength plate 28, and this circular polarization is incident on the liquid-crystal layer 26. If the circular polarization is reflected from the reflecting layer (for example, the pixel electrodes), then for example, in an off state, in which the circular polarization is not modulated by the liquid-crystal layer, its rotating direction is reversed. In contrast, in an on state, the rotating direction is maintained. The circular polarization passes through the quarter wavelength plate 28 and is thus converted into linear polarization. Then, in the off state, this linear polarization is absorbed by the polarizing plate 27 rather that being transmitted therethrough, whereas in the on state, it is transmitted through the polarizing plate 27 and further through the light guide panel 7 so that the observer can view it.

Thus, according to the construction of this example, if the front light 1 (liquid-crystal display 21) is observed from immediately above, then in particular, bright lines resulting from intense light close to the point light source 4 are unlikely to be viewed, thereby reliably reducing the occurrence of non-uniform luminance to improve display quality. Further, a triangular dark area as observed in the prior art is not so conspicuous, thereby further reliably reducing the occurrence of bright lines.

Figure 11:
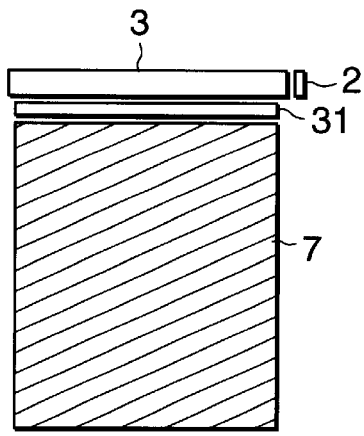
FIGS. 11 to 13 are plan views showing a light unit according to the other embodiments of the present invention.

The embodiment of the present invention has been described with reference to the drawings, but specific constructions are not limited to this embodiment. For example, as shown in FIG. 11, a diffusion member 31 may be interposed between the light guide 3 and the light guide panel 7. This corrects the bias of the intensity associated with the direction of light emitted from the light guide 3, thereby further improving display quality.

Figure 12:
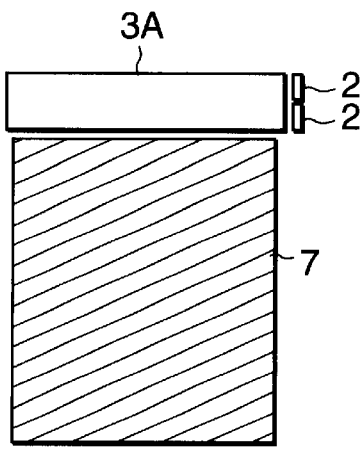
Figure 13:
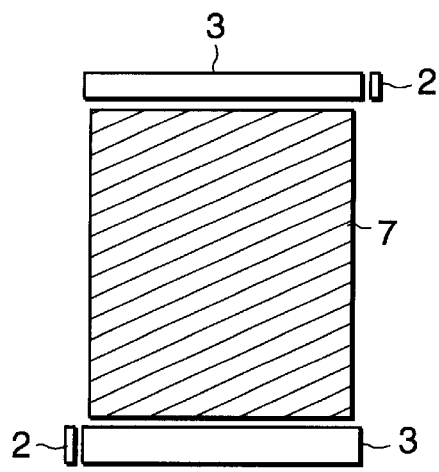

Further, if the quantity of light is to be increased, a plurality of point light sources 2 may be arranged at one end of the light guide 3A as shown in FIG. 12, or the light guide 3 and the point light source 2 may be arranged on each of the opposite facets of the light guide panel 7, as shown in FIG. 13. In particular, if the light guide 3 and the point light source 2 may be arranged on each of the opposite facets of the light guide panel 7, a required quantity of light spreads throughout the light panel guide 7 from the light guides 3, provided on the opposite facets. Consequently, the luminance of one point light source 2 can be reduced to further reduce the occurrence of disadvantageous bright lines occurring in the vicinity of the point light source, thus improving the uniformity of the luminance of planar illumination light from the light guide panel 7 to the liquid-crystal panel 22

Figure 14:
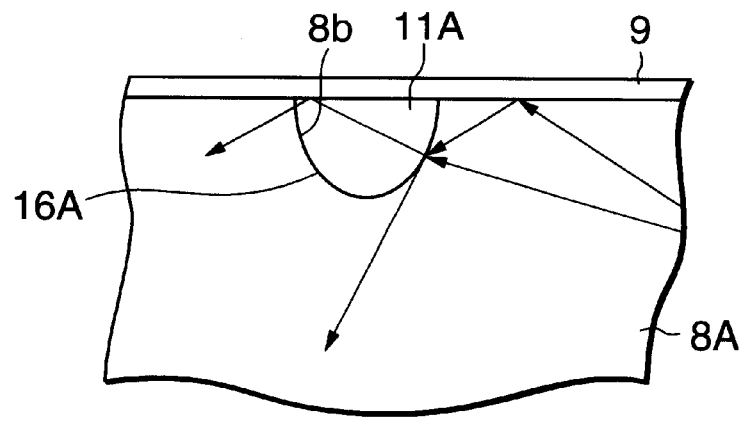
FIGS. 14 to 15 are sectional views showing some recesses and projections forming a prism of a plate-shaped light guide according to the embodiment of the present invention shown in FIG. 1 and FIGS. 11 to 13.

Further, in the above embodiment, the recesses 8a of the prismatic transparent member 8 are wedge-shaped, but the shape of the recesses 8a may be changed to adjust, for example, the luminance characteristic of band-shaped light obtained from the point light source. For example, if semi-cylindrical recesses 8b are used as shown in FIG. 14, light beams from the point light source 2 to the clearance 11A may have different incident angles depending on incident locations on the boundary surface 16A between the columnar transparent member 8A and the clearance 11A even if they travel in the same direction. As a result, the beams are reflected or refracted in various directions and diffused more uniformly than those in the case with the wedge-shaped recesses 8a.

Figure 15:
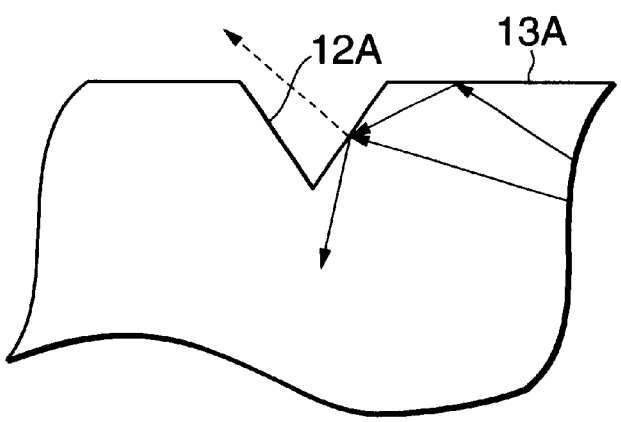

Further, in the above description, the prism surface of the light guide 7 is shaped so as to have the relatively steep reflecting surfaces 12 and the relatively gentle reflecting surfaces 13 alternately formed thereon. However, the uniformity of the luminance of planar illumination light from the light applied surface 5 can be improved by applying the provision of symmetrical-wedge-shaped grooves 12A as reflecting sections and flat portions 13A as transmitting sections, as shown in FIG. 15, notably to the case where the light guide 3 and the point light source 2 are arranged at each of the opposite ends of the light guide panel 7, as shown in FIG. 13.

Further, in the above embodiment, the point light source comprises white LEDs, but the color of the LEDs is not limited to white and incandescent lamps may be used instead of the LEDs.

Figure 16:
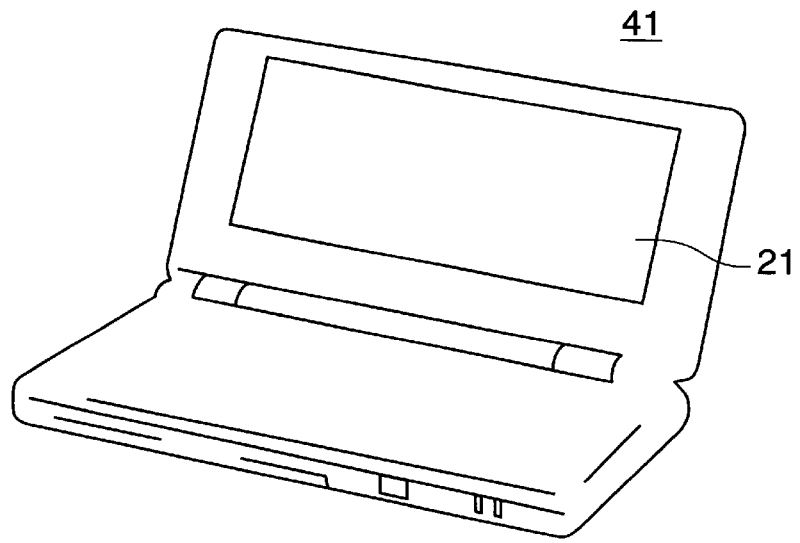
FIG. 16 is a perspective view of a personal digital assistance as an electronic equipment using a light unit according to one embodiment of the present invention.
Figure 17:
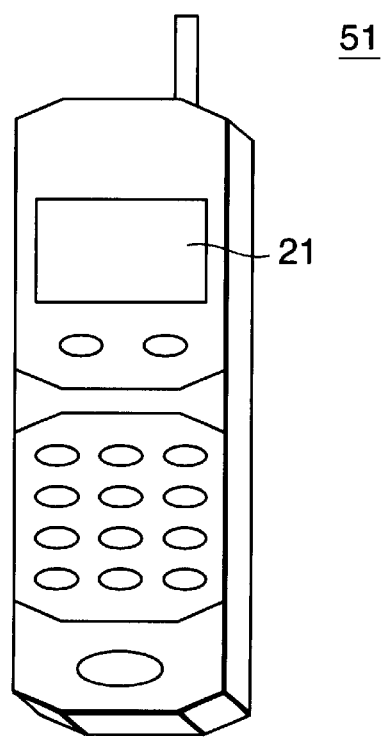
FIG. 17 is a perspective view of a cellular telephone as an electronic equipment using a light unit according to one embodiment of the present invention.
Figure 18:
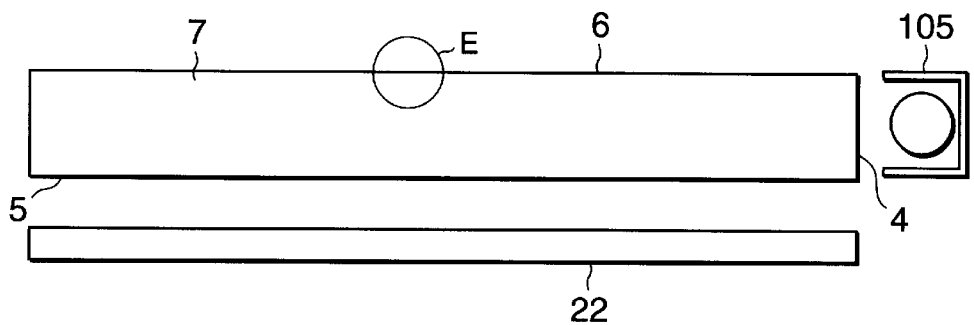
FIG. 18 is a side view of a liquid-crystal display according to the prior art.
Figure 19:
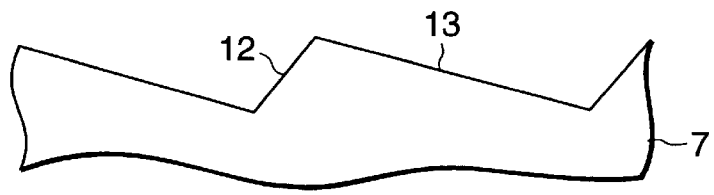
FIG. 19 is an enlarged view of a portion E of FIG. 18.
Figure 20:
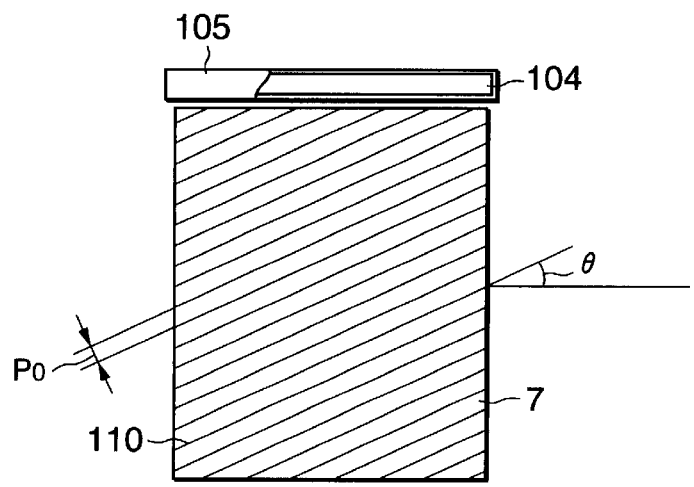
FIG. 20 is a plan view of a light unit according to the prior art.
Figure 21:
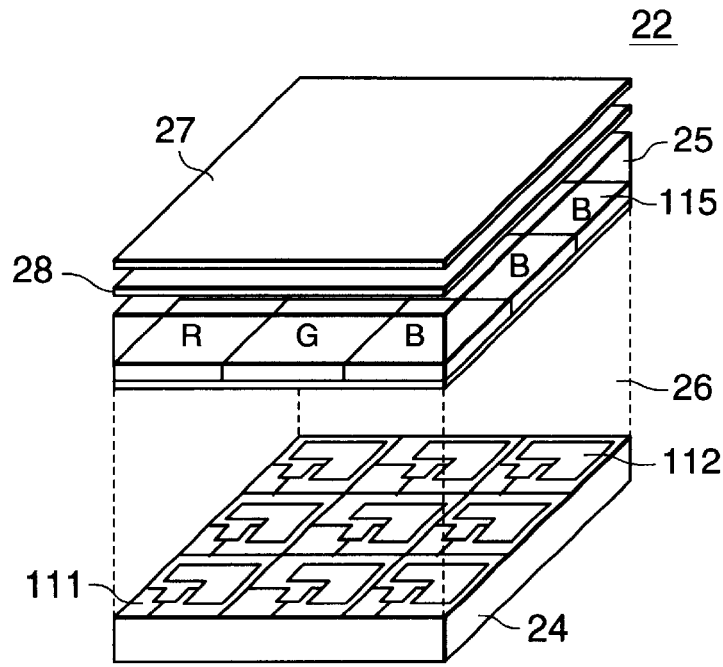
FIG. 21 is a perspective view of a liquid-crystal panel according to the prior art.
Figure 22:
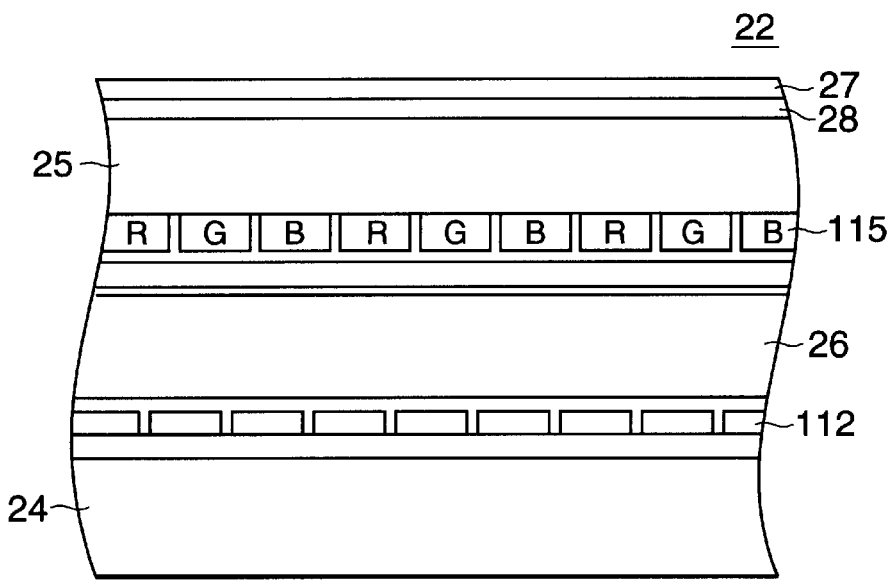
FIG. 22 is a side view of FIG. 21.
Figure 23:
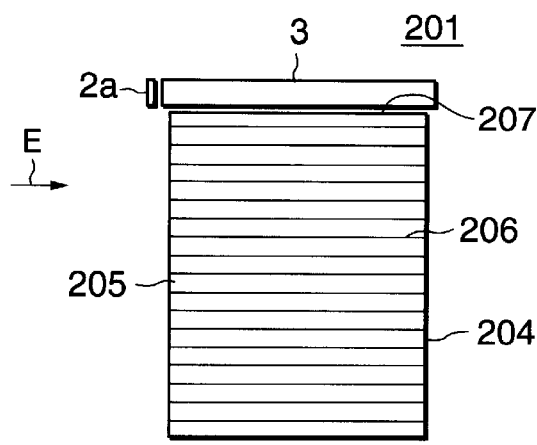
FIG. 23 is a plan view of a light unit according to the prior art.
Figure 24:
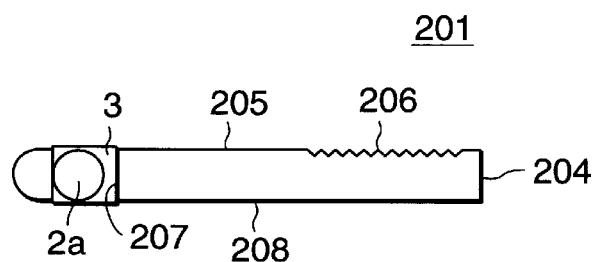
FIG. 24 is a side view of FIG. 23 as viewed from a direction of an arrow E.
Figure 25:
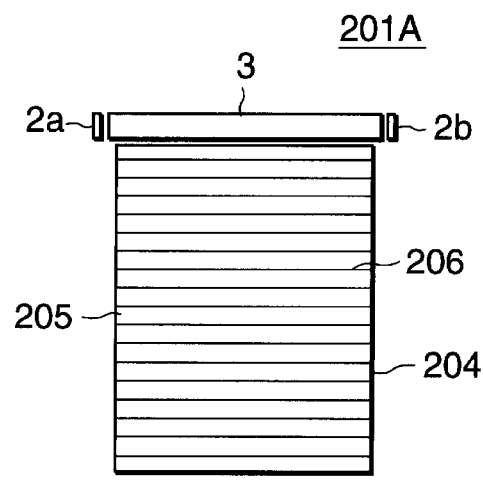
FIG. 25 is a plan view of a light unit according to the prior art.
Figure 26:
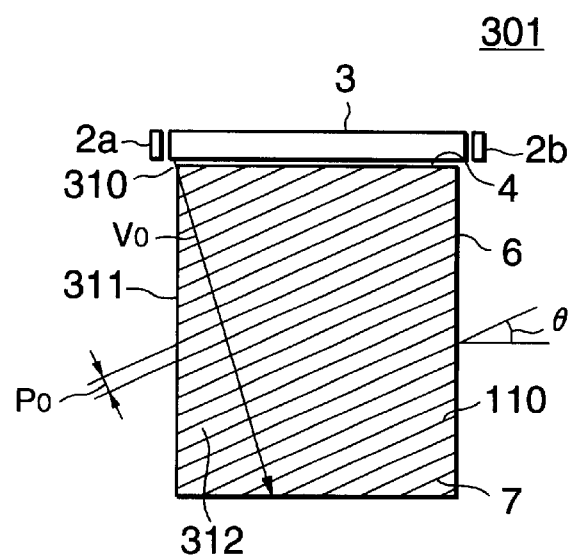
FIG. 26 is a plan view of a light unit according to the prior art.
Figure 27:
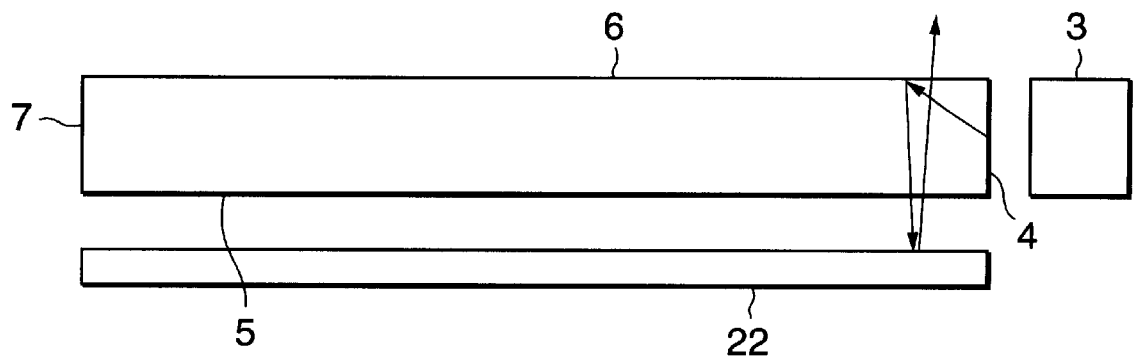
FIG. 27 is a side view of the light unit, illustrating functions according to the prior art.
Figure 28:
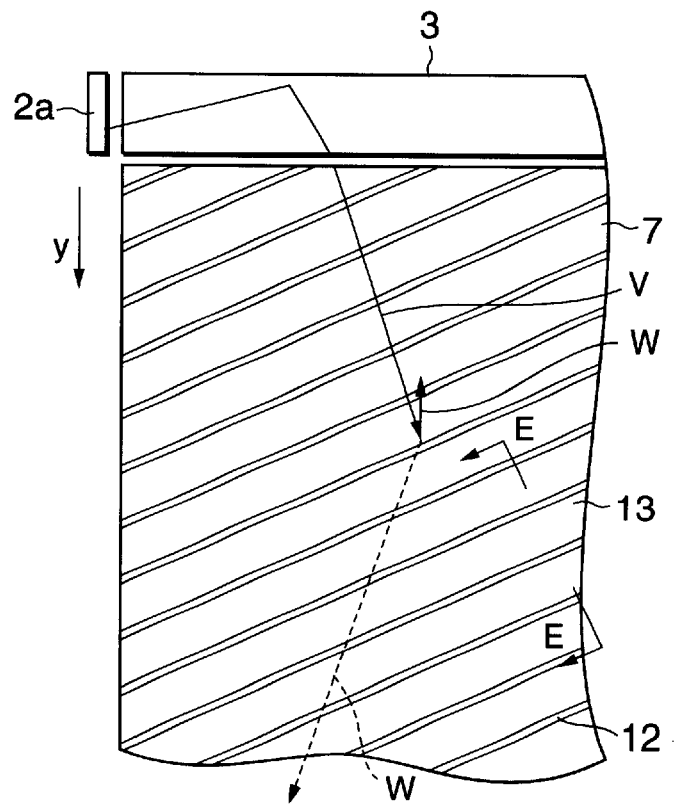
FIG. 28 is a partially enlarged plan view of the light unit, illustrating functions according to the prior art.
Figure 29:
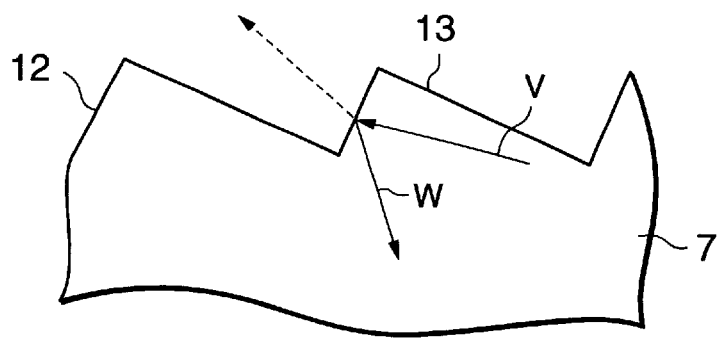
FIG. 29 is a sectional view taken along a line E—E in FIG. 28.
Figure 30:
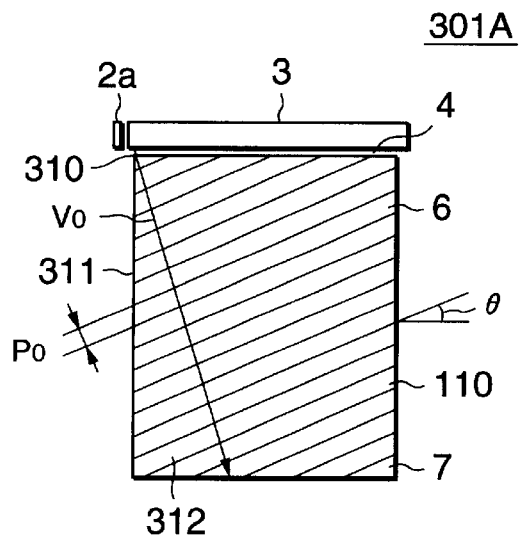
FIG. 30 is an explanatory representation illustrating the prior art.
Figure 31:
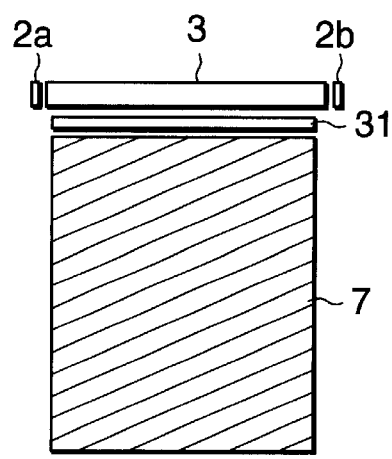
FIG. 31 is an explanatory representation illustrating the prior art.

Furthermore, as shown in FIG. 16, the liquid-crystal display 21 comprising the front light 1 described in the embodiment can be used to obtain a personal digital assistant (PDA) 41 as electronic equipment. The personal digital assistant 41 may provide an improved display quality compared to the prior art. In addition to the personal digital assistant, the liquid-crystal display 21 may be applied to portable or notebook personal computers. Further, as shown in FIG. 17, the liquid-crystal display 21 comprising the front light 1 described in the embodiment can be used to obtain, for example, a cellular telephone (electronic equipment) 51 that may provide an improved display quality compared to the prior art.

As described above, according to the present invention, the point light source is arranged at the end of the columnar light guide at which the angle between the longitudinal direction of the light guide and the direction of the stripes constituting the ridge lines is obtuse. Accordingly, light reaching the reflecting section obliquely enters it, so that, for example, main irradiation light impinging on the reflecting section after travelling in the direction in which the light is most intense has a larger incident angle than, for example, light impinging on the same surface after travelling in the direction orthogonal to the direction of the stripes. Thus, light reflected by the reflecting surface has a large reflection angle, and travels to a location relatively away from one immediately below the reflecting section.

Thus, if the prism surface is observed from immediately above, then in particular, bright lines resulting from intense light close to the point light source are unlikely to be viewed, thereby reliably reducing the occurrence of non-uniform luminance to improve display quality.

That is, the present invention employs the point light source, which requires no inverter in contrast to fluorescent lamps, thereby providing a front light, a liquid-crystal display having this front light mounted therein, and electronic equipment having this liquid-crystal display mounted therein wherein even if they have a reduced power consumption, size, and weight, the non-uniformity of luminance can be reduced to the same level as that of fluorescent lamps to improve display quality. Consequently, the present invention is preferably applicable to electronic equipment and especially cellular telephones, the power consumption, size, and weight of which are desired to be reduced.

In the above description, the light unit of the present invention is used as a front light, but even if it is used as a back light, a liquid-crystal display can be constituted which has effects similar to those produced by the light unit as a front light.

What is claimed is:

1. A light unit, comprising:
   a point light source;
   a columnar light guide that reflects light emitted from said point light source to emit generally band-shaped light; and
   a rectangular plate-shaped light guide that receives the light emitted from said columnar light guide, through a facet thereof, and reflects and refracts the light received through said facet, using a prism surface thereof having recesses and projections formed thereon and forming a plurality of lineal parallel ridge lines, so that planar light is emitted from a light applied surface thereof which is opposite said prism surface,
   wherein said point light source is arranged only at an end of a facet of said columnar light guide at which the angle between a direction of a light emitted from said point light source and said ridge lines on said rectangular plate-shaped light guide is acute, such that said ridge lines incline away from said point light source.

2. A light unit, comprising:
   at least one point light source;
   at least one columnar light guide that receives light emitted from said point light source, through an end thereof, and reflects and refracts the received light while guiding it in a longitudinal direction thereof, to emit generally band-shaped light through a side surface thereof; and
   a rectangular plate-shaped light guide that receives light emitted from said at least one columnar light guide through a facet thereof, and reflects and refracts the light received through the facet using a prism surface having recesses and projections formed thereon and forming a plurality of linear parallel ridge lines inclined through a predetermined angle from the longitudinal direction of said columnar light guide, so that planar light is emitted from a light applied surface of the plate-shaped light guide which is opposite said prism surface,
   wherein each said point light source is arranged only at an end of said facet of said at least one columnar light guide at which the angle between a direction of light emitted from said point light source and said ridge lines on said rectangular plate-shaped light guide is acute, such that said ridge lines incline away from said point light source.

3. The light unit according to claim 2,
   wherein said columnar light guide is arranged at each of the opposite sides of said rectangular plate-shaped light guide, and said at least one point light source is arranged only at the end of each of said columnar light guides at which the angle between a direction of a light emitted from said point light source and said ridge lines on said rectangular plate-shaped light guide is acute, such that said ridge lines incline away from said point light source.

4. The light unit according to claim 2,
   wherein a plurality of point light sources is provided only at the end of each of said columnar light guides at which the angle between a direction of a light emitted from said point light source and said ridge lines on said rectangular plate-shaped light guide is acute, such that said ridge lines incline away from said point light source.

5. The light unit according to claim 2,
   wherein said recesses and projections comprise recesses shaped like semi-triangular poles.

6. The light unit according to claim 2,
   wherein said recesses and projections comprise recesses shaped like isosceles triangles in which two depth-wise sides have an equal length in a cross section thereof perpendicular to a surface of said rectangular plate-shaped light guide.

7. A liquid-crystal display, comprising:

a point light source;

a columnar light guide that receives light emitted from said point light source through an end thereof, and reflects and refracts the received light while guiding it in a longitudinal direction thereof, to emit generally band-shaped light through a side surface thereof;

a rectangular plate-shaped light guide that receives light emitted from said columnar light guide through a facet thereof, and reflects and refracts the light received through the facet using a prism surface having recesses and projections formed thereon and forming a plurality of linear parallel ridge lines inclined through a predetermined angle from the longitudinal direction of said columnar light guide, so that planar light is emitted from a light applied surface of the rectangular plate-shaped light guide which is opposite said prism surface; and a liquid-crystal panel arranged opposite the prism surface of said plate-shaped light guide, wherein said point light source is arranged only at an end of said facet of said columnar light guide at which the angle between a direction of a light emitted from said point light source and said ridge lines on said rectangular plate-shaped light guide is acute, such that said ridge lines incline away from said point light source, and wherein the point light source, the columnar light guide and the rectangular plate-shaped light guide form a light unit that is used as a front light.

8. The liquid-crystal display according to claim 7, wherein said ridge lines are formed so as to incline through a predetermined angle relative to a direction in which pixels provided in said liquid-crystal panel are arranged.

* * * * *